US010244060B2

(12) United States Patent
Narayanam et al.

(10) Patent No.: US 10,244,060 B2
(45) Date of Patent: Mar. 26, 2019

(54) DETERMINING SEEDS FOR TARGETED NOTIFICATIONS THROUGH ONLINE SOCIAL NETWORKS IN CONJUNCTION WITH USER MOBILITY DATA

(71) Applicant: International Business Machines Corporation, Armonk, NY (US)

(72) Inventors: Ramasuri Narayanam, Bangalore (IN); Krishnasuri Narayanam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 14/929,938

(22) Filed: Nov. 2, 2015

(65) Prior Publication Data
US 2017/0126822 A1 May 4, 2017

(51) Int. Cl.
*G06Q 30/02* (2012.01)
*G06Q 50/00* (2012.01)
*H04L 29/08* (2006.01)

(52) U.S. Cl.
CPC ......... *H04L 67/22* (2013.01); *G06Q 30/0269* (2013.01); *G06Q 50/01* (2013.01); *H04L 67/306* (2013.01)

(58) Field of Classification Search
CPC .... G06Q 30/0269; G06Q 50/01; H04L 67/22; H04L 67/306
(Continued)

(56) References Cited

U.S. PATENT DOCUMENTS 8,244,664 B2 * 8/2012 Ghosh ............... G06Q 30/02
706/54
8,375,024 B2 2/2013 Goeldi
(Continued)

FOREIGN PATENT DOCUMENTS

WO WO-2016029936 A1 * 3/2016 ............ H04W 4/029

OTHER PUBLICATIONS

1. Chao Zhang Lidan Shou Ke Chen Gang Chen Yijun Bei. Evaluating Geo-Social Influence in Location-Based Social Networks. In Proceedings of CIKM 2012.
(Continued)

*Primary Examiner* — Daniel C. Murray
*Assistant Examiner* — Adam A Cooney
(74) *Attorney, Agent, or Firm* — Ryan, Mason & Lewis, LLP

(57) ABSTRACT

Methods, systems, and computer program products for determining seeds for targeted notifications through online social networks are provided herein. A computer-implemented method includes analyzing user mobility data associated with multiple users of a social network to identify spatio-temporal relationships among the users; computing, for each of the users, a value representing the user's level of influence in relation to other users, wherein the value is based on the spatio-temporal relationships and a product and/or service to be identified in a spread of information within the social network; segmenting the users into groups based on the computed value for each user, wherein a first group comprises each user associated with a computed value above a given threshold, and wherein a second group comprises each user associated with a computed value below the given threshold; and selecting one or more users from the first group to initiate the spread of information.

17 Claims, 8 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 9,053,497 | B2* | 6/2015 | Benyamin | G06Q 30/0269 |
| 9,485,318 | B1* | 11/2016 | Harris | H04W 4/029 |
| 2010/0145777 | A1* | 6/2010 | Ghosh | G06Q 30/02 705/14.1 |
| 2010/0280904 | A1 | 11/2010 | Ahuja | |
| 2011/0074767 | A1* | 3/2011 | Bezy | G06T 19/00 345/419 |
| 2012/0278261 | A1 | 11/2012 | Lin et al. | |
| 2012/0278395 | A1* | 11/2012 | Garcia | G06Q 10/00 709/205 |
| 2013/0041860 | A1* | 2/2013 | Lawrence | G06Q 10/10 706/46 |
| 2013/0073473 | A1* | 3/2013 | Heath | G06Q 30/02 705/319 |
| 2014/0337359 | A1* | 11/2014 | Airoldi | G06F 17/3053 707/748 |
| 2015/0019474 | A1* | 1/2015 | Barbieri | G06Q 30/0201 706/53 |
| 2015/0120717 | A1* | 4/2015 | Kim | G06F 17/30699 707/727 |
| 2015/0294221 | A1* | 10/2015 | Andres Gutierrez | G06Q 30/0261 706/46 |

OTHER PUBLICATIONS

Huiji Gao, Jiliang Tang, Xia Hu, and Huan Liu. Modeling Temporal Effects of Human Mobile Behavior on Location-Based Social Networks. In Proceedings of CIKM 2013.

Dashun Wang, Dino Pedreschi, Chaoming Song, Fosca Giannotti, and A-.L. Barabási. Human Mobility, Social Ties, and Link Prediction. In Proceedings of SIGKDD, 2011.

4. L. Backstrom, E. Sun, and C. Marlow, "Find me if you can: Improving geographical prediction with social and spatial proximity," in WWW, Apr. 2010.

5. E. Cho, S. A. Myers, and J. Leskovec, "Friendship and mobility: user movement in location-based social networks," in ACM SIGKDD KDD, Aug. 2011.

A. Monreale, F. Pinelli, R. Trasarti, and F. Giannotti, "Wherenext: A location predictor on trajectory pattern mining," in ACM SIGKDD KDD, Jun. 2009.

D. Kempe, J. Kleinberg, and E. Tardos, "Maximizing the spread of influence through a social network," in ACM SIGKDD KDD, Aug. 2003.

W. Hwang, Y.-r. Cho, A. Zhang, and M. Ramanathan. Bridging Centrality: Identifying Bridging Nodes in Scalefree Networks. In SIGKDD 2006.

J. Aspnes, K. Chang, A. Yampolsikiy. Inoculation strategies for victims of viruses and the sum-of-squares partition problem. Journal of Computer and System Sciences, 72(6):1077-1093, 2006.

L.C. Freeman. Centrality in social networks: Conceptual clarification. Social Networks, 1(3):215-239, 1979.

S.P. Borgatti and M.G. Everett. A Graph-Theoretic Perspective on Centrality. Social Networks, 28:466-484, 2005.

U. Brandes. A faster algorithm for betweenness centrality. Journal of Mathematical Sociology, 25:163-177, 2001.

Su et al., Making Sense of Trajectory Data: A Partition- and-Summarization Approach, 31st International Conference on Data Engineering (ICDE), Seoul, Korea, 2015.

M. Bielli, A. A Boulmakoul, and H. Mouncif. Object modeling and path computation for multimodal travel systems. In European Journal of Operational Research, vol. 175, pp. 1705-1730, Dec. 2006.

15. K.G. Zografos, K.N. Androutsopoulos. Algorithms for Itinerary Planning in Multimodal Transportation Networks. In IEEE Transactions on Intelligent Transportation Systems, 9(1):175-184, 2008.

16. Joel Booth, Prasad Sistla, Ouri Wolfson, and Isabel F. Cruz. 2009. A data model for trip planning in multimodal transportation systems. In Proceedings of the 12th International Conference on Extending Database Technology: Advances in Database Technology (EDBT '09).

Yuan, J., Zheng, Y., Xie, X.: Discovering regions of different functions in a city using human mobility and pois. In: SIGKDD. pp. 186-194 (2012).

Ferrari, L., Rosi, A., Mamei, M., Zambonelli, F.: Extracting urban patterns from location-based social networks. In: SIGSPATIAL. pp. 9-16 (2011).

Zhijun Yin, Liangliang Cao, Jiawei Han, Jiebo Luo, Thomas S. Huang: Diversified Trajectory Pattern Ranking in Geo-tagged Social Media. SDM 2011.

Iyer et al., Algorithms for Approximate Minimization of the Difference Between Submodular Functions, with Applications. UAI 2012: 407-417.

21. Kurashima et al., Geo topic model: joint modeling of user's activity area and interests for location recommendation. In: WSDM. pp. 375-384 (2013).

* cited by examiner

302

$$\arg\max_{S:|S|\leq k} \sigma_A(S,T) - \sigma_{V\setminus A}(S,T)$$

$$\sigma_A(S,T) = E\left[\sum_{v\in A} I(t_v < T)\right]$$

$$= \sum_{v\in A} Pr(t_v < T)$$

$$\sigma_{V\setminus A}(S,T) = E\left[\sum_{v\in V\setminus A} I(t_v < T)\right]$$

$$= \sum_{v\in V\setminus A} Pr(t_v < T)$$

FIG. 3

402 let $f(S)$ denote $\sigma_A(S,T)$, denote $\sigma_{V \setminus A}(S,T)$, and $\upsilon(S) = f(S) - g(S)$ $$m_X^g(Y) = g(X) - \sum_{\upsilon \in X \setminus Y} [g(X) - g(X \setminus \{\upsilon\})] + \sum_{\upsilon \in Y \setminus X} g(\{\upsilon\})$$

Let $h_X(Y) := f(Y) - m_X^g(Y)$ $h_X(u|Y) := f(Y \cup \{u\}) - f(Y) - [m_X^g(Y \cup \{u\}) - m_X^g(Y)]$
$= g(Y \cup \{u\}) - f(Y) - g(X) + g(X - \{u\})$ if $u \in X$
$= f(Y \cup \{u\}) - f(Y) - g(\{u\})$ if $u \notin X$

$S^0 = \phi, t = 0$
while $S^t \neq S^{t+1}$ do
    $S = \phi$
    while $|S| < k$ do
        $u = \arg\max_u h_{S^t}(u|S)$
        if $h_{S^t}(u|S) > 0$ then
            $S = S \cup \arg\max_u h_{S^t}(u|S)$
        else
            break
    $S^{t+1} = S$
    $t = t + 1$

DETERMINING SEEDS FOR TARGETED NOTIFICATIONS THROUGH ONLINE SOCIAL NETWORKS IN CONJUNCTION WITH USER MOBILITY DATA

FIELD

The present application generally relates to information technology, and, more particularly, to social network-based notification techniques.

BACKGROUND

Online social networks and communities are prevalent in spreading information, such as, for example, in connection with marketing efforts. However, existing marketing approaches commonly lack the ability to capture and/or utilize additional information regarding which individuals in the social network are candidates for imparting influence.

SUMMARY

In one embodiment of the present invention, techniques for determining seeds for targeted notifications through online social networks in conjunction with user mobility data are provided. An exemplary computer-implemented method can include steps of analyzing user mobility data associated with multiple users of a social network to identify one or more spatio-temporal relationships among the multiple users; computing, for each of the multiple users, a value representing the respective user's level of influence in relation to one or more other users among the multiple users, wherein the value is based on (i) the one or more identified spatio-temporal relationships among the multiple users and (ii) a product and/or service to be identified in a spread of information within the social network; segmenting the multiple users of the social network into at least two groups based on the computed value for each of the multiple users, wherein a first of the at least two groups comprises each of the multiple users associated with a computed value above a given threshold, and wherein a second of the at least two groups comprises each of the multiple users associated with a computed value below the given threshold; and selecting one or more users from the first group to initiate the spread of information within the social network.

In another embodiment of the invention, an exemplary computer-implemented method can include steps of analyzing mobility data associated with multiple nodes of a graph to identify one or more spatio-temporal relationships among the multiple nodes, wherein the graph represents a social network and wherein each of the multiple nodes represents a user of the social network; computing, for each of the multiple nodes, a value representing the respective node's level of influence in relation to the multiple nodes of the graph, wherein the value is based on the one or more identified spatio-temporal relationships; segmenting the multiple nodes of the graph into at least two groups based on the computed value for each of the multiple nodes, wherein a first of the at least two groups comprises each of the multiple nodes associated with a computed value above a given threshold, and wherein a second of the at least two groups comprises each of the multiple nodes associated with a computed value below a given threshold; and selecting one or more seed nodes from the nodes in the first group to initiate a spread of information within the graph.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating formulation of an objective function, according to an example embodiment of the invention;

FIG. 4 is a diagram illustrating formulation of an objective function, according to an example embodiment of the invention;

FIG. 5 is a diagram illustrating a greedy algorithm, according to an example embodiment of the invention;

DETAILED DESCRIPTION

Figure 1:
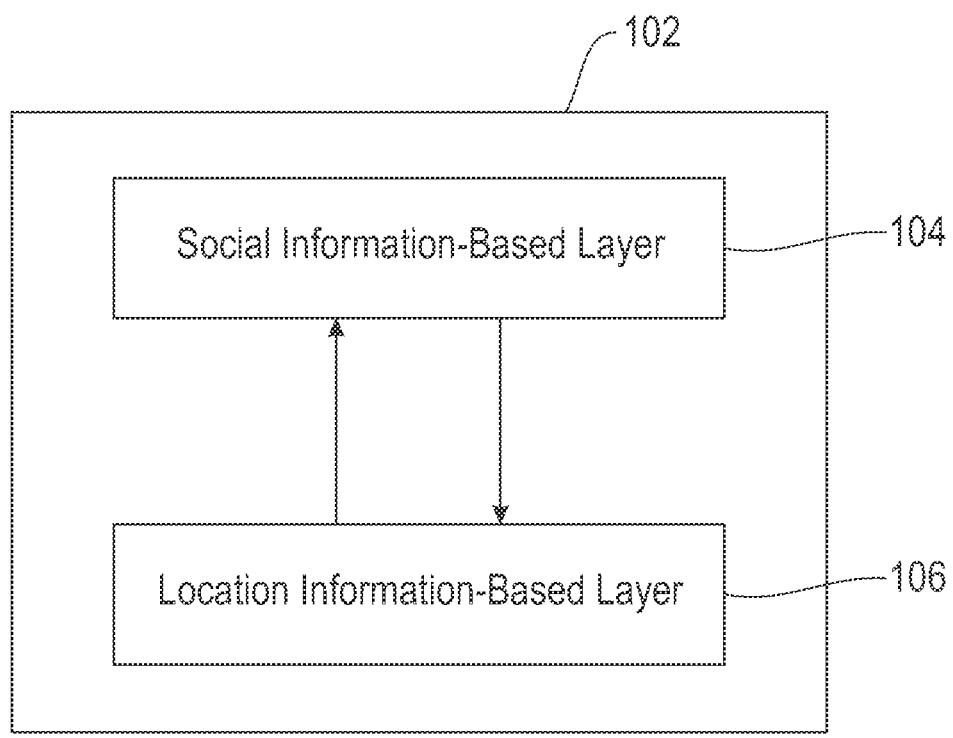
FIG. 1 is a diagram illustrating system architecture, according to an example embodiment of the invention.

As described herein, an embodiment of the present invention includes determining seeds for focused advertising through online social networks in conjunction with user mobility information. As used herein, a "seed" in a social network refers to an entity representing a vertex that first adopts the product (or service) motivated by the incentives provided by the company that conducts the marketing campaign/effort. At least one embodiment of the invention includes determining a context-specific intrinsic value for each of multiple users (in a social network, for example) for focused marketing of products and/or services based on one or more social networks and identified locations and geographical distances among users therein. Such an embodiment can include, for example, analyzing user mobility data, wherein user mobility data (in the form of trajectories, for instance) can include spatio-temporal information (such as the locations of users at different time slots/instances). Additionally, in analyzing user mobility data, one or more embodiments of the invention can include implementing trajectory analytics to derive user intent and/or behavior. As used herein, the term "trajectory analytics" refers to any algorithm that derives meaningful information from trajectory data. Using such analysis, one or more embodiments of the invention can include deriving user movement patterns such as when a user goes to an office, when the user visits restaurants and which restaurants, whether the user travels using public transportation, etc.

At least one embodiment of the invention can also include segmenting the underlying social network(s) to (i) one or more focused segments and (ii) one or more unfocused segments based on the determined intrinsic values for the users. In at least one embodiment of the invention, using the intrinsic user values to carry out the above-noted segmenting task can include (1) deriving the intrinsic value for each user in the social network, (2) defining a threshold (T), (3) defining the collection of all users having an intrinsic value greater than or equal to T as the "Focused Segment," and (4) defining all remaining users (that is, those users having an intrinsic value less than T) as the "Unfocused Segment."

Further, such an embodiment can include using the segments to select one or more initial seeds for a focused marketing effort and/or campaign. Also, one or more embodiments of the invention includes designing one or more influence maximization strategies to determine the initial seed(s) to maximize the adoption of the product and/or service in the focused segment while minimizing the diffusion through the unfocused segment. As additionally described herein, in selecting the initial seed(s) for a marketing effort, at least one embodiment of the invention includes implementing an objective function that encompasses the difference between two sub-modular functions.

By way merely of illustration, consider the following example scenario involving a taxi cab service provider, S. A discount code (provided by S) is given to a set of seed nodes, and this discount code can be used only once by any user. There is also a cap on the total number of times that the discount code can be used overall. On using this incentive, a user can broadcast this discount code to one or more friends (via a social network, for example). However, in this example scenario, only frequent cab hirers would convert to adopters and use S more frequently, and reaching out to non-candidate users would be deemed to waste instances of the discount codes.

Accordingly, at least one embodiment of the invention can be implemented to derive the context specific value of one or more individuals in a social networks, given the context of the product to be advertised and/or marketed. Also, one or more embodiments of the invention can be implemented to determine one or more initial seeds to maximize the adoption in the candidate segment while minimizing the diffusion through the non-candidate segment in a given social network.

FIG. 1 is a diagram illustrating system architecture, according to an embodiment of the invention. By way of illustration, FIG. 1 depicts an example location-based social network 102, which includes a social information-based layer 104 and a location information-based layer 106. As detailed herein, the social information-based layer 104 provides social information to the location information-based layer 106, and the location information-based layer 106 provides location information (such as user mobility data) to the social information-based layer 104. In at least one embodiment of the invention, the social information-based layer 104 contains information about "who is friend with whom." If this information is transferred to the location information-based layer 106, information such as, for example, how friends visit different locations together, can be determined. Additionally, using the information from the location information-based layer 106, at least one embodiment of the invention can include deriving useful information in the social information-based layer 104 such as, for example, which places a user co-visits and what sort of places the user typically likes, etc.

Figure 2:
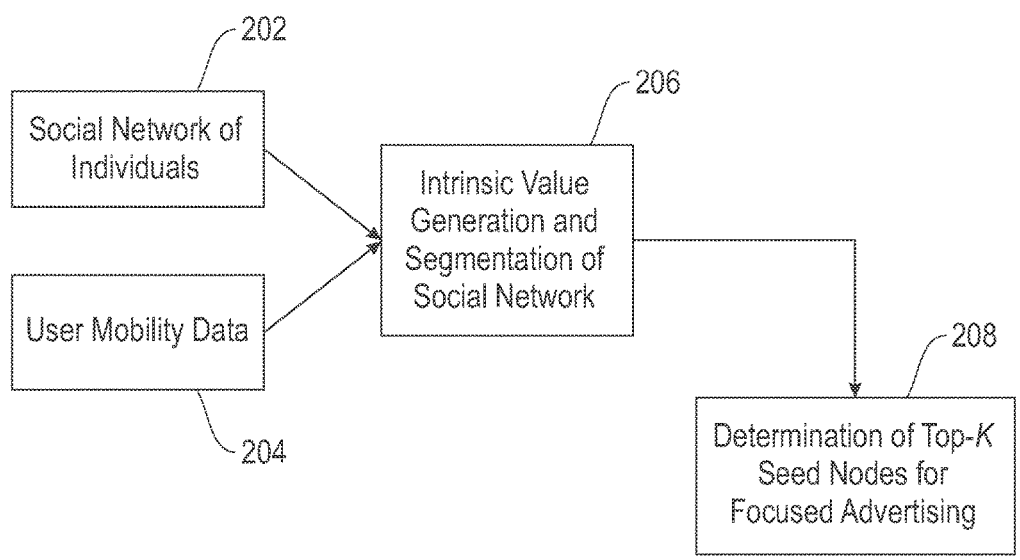
FIG. 2 is a diagram illustrating system architecture, according to an embodiment of the invention.

FIG. 2 is a diagram illustrating system architecture, according to an embodiment of the invention. By way of illustration, FIG. 2 depicts data 202 pertaining to a social network of individuals, and user mobility data 204, which are provided to component 206, which calculates and/or determines the intrinsic value for each of the individuals and segments the social network based on these inputs. Element 202 provides information about the set of users, the users' profile data, and connection details. Element 204 provides spatio-temporal data, such as the locations of users at different time periods. Accordingly, element 206 can derive the intrinsic value for each user in the social network, define a threshold, and define the collection of users into a focused segment and an unfocused segment based on the threshold.

Component 206 subsequently outputs the intrinsic values and the segmentation information to component 208, which uses these outputs to determine the top-k seed nodes (among the individuals of the social network) to carry out a focused advertising and/or marketing effort. The process of determining seed nodes is illustrated, for example, in FIG. 4 and FIG. 5. Intuitively, seed nodes are those which have more influence over their neighborhood in the social network compared to other nodes in that network. The larger the influence in the network, the larger the expected number of nodes that will adopt the product (which fulfils the goal of the targeted advertising task).

User mobility data 204 can include, for example, user profiles (associated with the individuals of the social network) containing information such as locations visited, purpose of visiting each location visited, frequency of visitation of each locations, identification of frequent routes traveled by a user, mode of transportation utilized by a user during mobility, etc. Such information can be implemented, for example, to identify and/or determine geographical distances among users which, in turn, facilitates deriving additional information such as a level of influence (among the social network) associated with one or more of the individuals.

By way of illustrating how the noted geographical distance information helps derive influence information, consider the following example scenarios. In a first scenario, consider user A and user B living in the same geographical area, wherein the possibility of these two individuals meeting each other is high. Accordingly, the likelihood of one of the users influencing the other in some way is non-trivial. In a second scenario, consider user A and user B living in two different geographical areas, wherein the possibility of these two individuals meeting each other is reduced. Accordingly, one of the users influencing the other in some way is also reduced.

Given a particular product or service, as well as the context of an advertisement associated therewith, user mobility data (such as the example types of information noted above) can be utilized to determine the intrinsic value of each user using trajectory data in conjunction with one or more maps (a city road network, etc.). By way merely of illustration, consider an example embodiment of the invention that includes utilizing trajectory data and one or more city maps. Such an embodiment can include implementing one or more algorithms for trajectory analytics to derive user intents, movement patterns, etc. The method of deriving intrinsic value for a user can be specific to the product (or service) being advertised through a marketing approach. Consider, for example, that the product is a metro pass. Using the trajectory analysis of user movements, at least one embodiment of the invention can include determining whether that user uses the Metro or not. If the user uses the Metro, then the intrinsic value of that user for the product "Metro Pass" is proportional to the frequency with which the user uses the Metro. If the user does not use the Metro, then the user's intrinsic value is zero.

By way merely of illustration, consider the following example wherein the product is a public transportation pass and the marketing context is to provide offers to buy the pass in order to attract more customers for public transportation. Accordingly, one or more embodiments of the invention can include analyzing the trajectory data (for example, the locations of users at various time stamps) along with relevant maps (such as, for example, maps of the city road network) to determine information such as, for example, the number of people who use the city public transportation and how frequently such people use the city public transportation. Additionally, at least one embodiment of the invention can also determine information such as the number of people that do not use the public transportation. Further, at least one embodiment of the invention can include determining the intrinsic value of each user proportional to the frequency with which the given user uses the public transportation. There can be several ways in which an embodiment of the invention can derive the intrinsic value. By way of merely one example, the intrinsic value can equal the sum of the user's travel times in the Metro (in hours).

As additionally detailed herein, one or more embodiments of the invention can include partitioning or segmenting an underlying social network (represented as a graph G=(V, E)) into (i) one or more focused segments and (ii) one or more unfocused segments based on the determined intrinsic values of the users (of the underlying social network). As used herein, "V" is the set of nodes in the social network that represents the set of users, and "E" is the set of edges in the social network that represents the number of friendships/connections among the users in the network. To establish paths between nodes in a focused segment, at least one embodiment of the invention includes utilizing the presence of nodes in one or more unfocused segments as well.

By way of illustration, consider an example wherein A, B, and C are three nodes (that is, users) in a social network, and assume that A is connected to B, B is connected to C, and that there is no connection between A and C. Also, assume that (A→B→C) is the only method for A to reach C in the network. After calculating intrinsic values, it is possible that A and C belong to a focused segment and B belongs to unfocused segment. Given the above two facts, it is seen that B is mandatory to connect A to C.

Accordingly, at least one embodiment of the invention includes implementing an algorithm whereby the objective of a focused advertising and/or marketing effort would be to maximize the diffusion through a focused segment (referred to here as A) and minimize the diffusion through an unfocused segment. Such an algorithm can be represented, for example, via arg $\max_{S:|S|\leq k} \sigma_A(S,T) - \sigma_{V\setminus A}(S,T)$, wherein S represents the set of seeds, T represents the time frame in question, V is the set of nodes in the social network that represents the set of users, k is the number of seeds to be determined, the first term ($\sigma_A(S,T)$) is the expected utility from the focused segment, and the second term ($\sigma_{V\setminus A}(S,T)$) is the expected utility loss from the unfocused segment.

As such, and as further detailed herein (for example, in FIG. 3 and FIG. 4), at least one embodiment of the invention includes implementing an objective function that encompasses the difference between two sub-modular functions. Additionally, and as also further detailed herein (for example, in FIG. 5), at least one embodiment of the invention includes implementing a greedy algorithm based on sub-modular function optimization techniques to determine the top-k seeds (from a collection of individuals in a social network) to maximize the diffusion through a focused segment of a given social network.

FIG. 3 is a diagram illustrating formulation of an objective function 302, according to an example embodiment of the invention, and in connection with the algorithm detailed above. Given a value for "k," the objective is to determine k seeds that maximize influence through the focused segment and minimize the influence through the unfocused segment. As also used in FIG. 3, "Pr" refers to "Probability," "E" refers to "Expectation" and is an operator in Probability Theory, "I" refers to "Indicator Function" and is a standard function in Probability Theory, and "t" is a variable that refers to time.

FIG. 4 is a diagram illustrating formulation of an objective function 402, according to an example embodiment of the invention, and in connection with the algorithm detailed above. FIG. 4 illustrates a way of deriving the closed form expression, using the objective function depicted in FIG. 3 that helps in selecting the k seeds using the algorithm depicted in FIG. 5. As used in FIG. 4, "$f$" is a function, "v" is another function, "g" is yet another function, "X" is a set of nodes, "Y" is another set of nodes, "h" is a function, and "u" is a node.

FIG. 5 is a diagram illustrating a greedy algorithm 502, according to an example embodiment of the invention. Algorithm 502 selects k seeds in an iterative fashion. In each iteration of algorithm 502, a node is chosen as a seed for which the influence on its neighborhood is maximum.

Figure 6A:
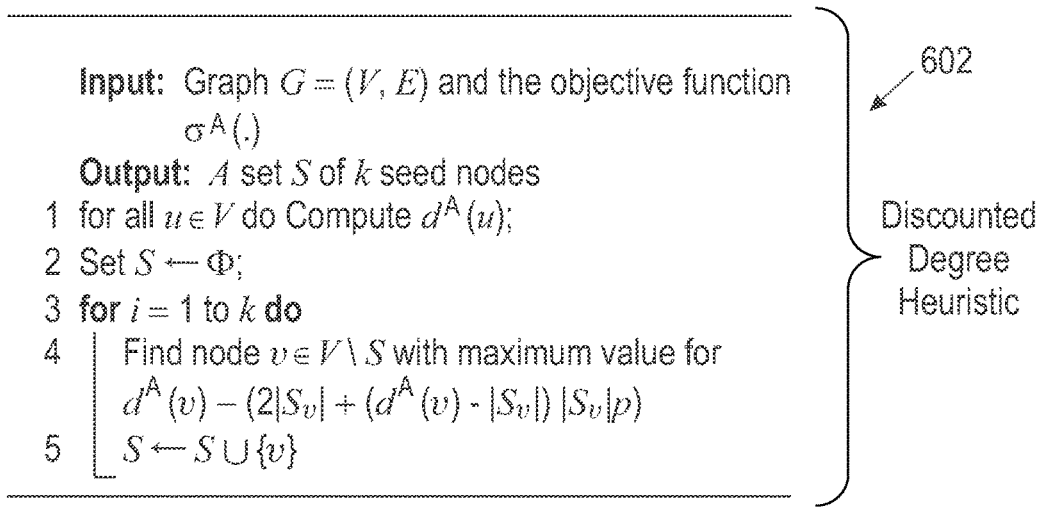
FIG. 6A is a diagram illustrating a discounted degree heuristic, according to an example embodiment of the invention.
Figure 6B:
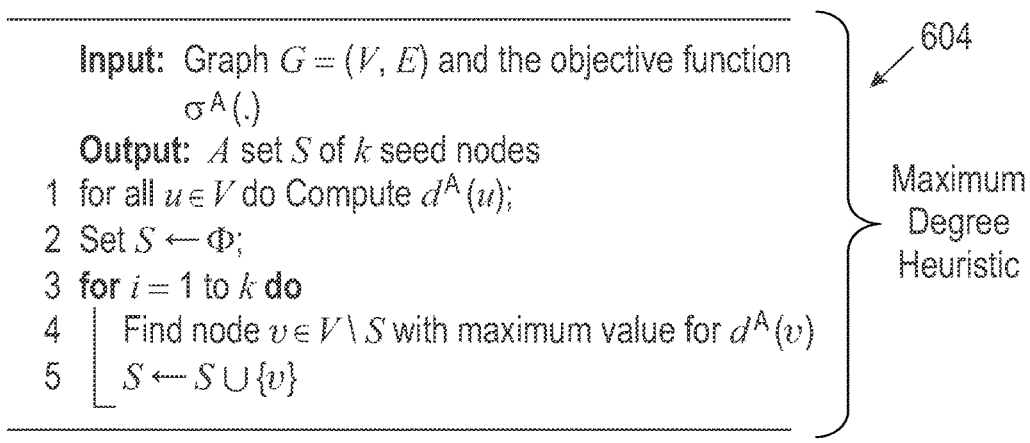
FIG. 6B is a diagram illustrating a maximum degree heuristic, according to an example embodiment of the invention.

FIG. 6A is a diagram illustrating a discounted degree heuristic 602, according to an example embodiment of the invention. FIG. 6B is a diagram illustrating a maximum degree heuristic 604, according to an example embodiment of the invention. In both algorithm 602 and algorithm 604, a goal is to select k seeds for the targeted marketing campaigns. As used in FIG. 6A and/or FIG. 6B, "a" is the objective function shown in FIG. 3, "d" is the degree of node, "Φ" represents a null set, and "i" is a variable to represent a value from 1 to k.

Figure 7:
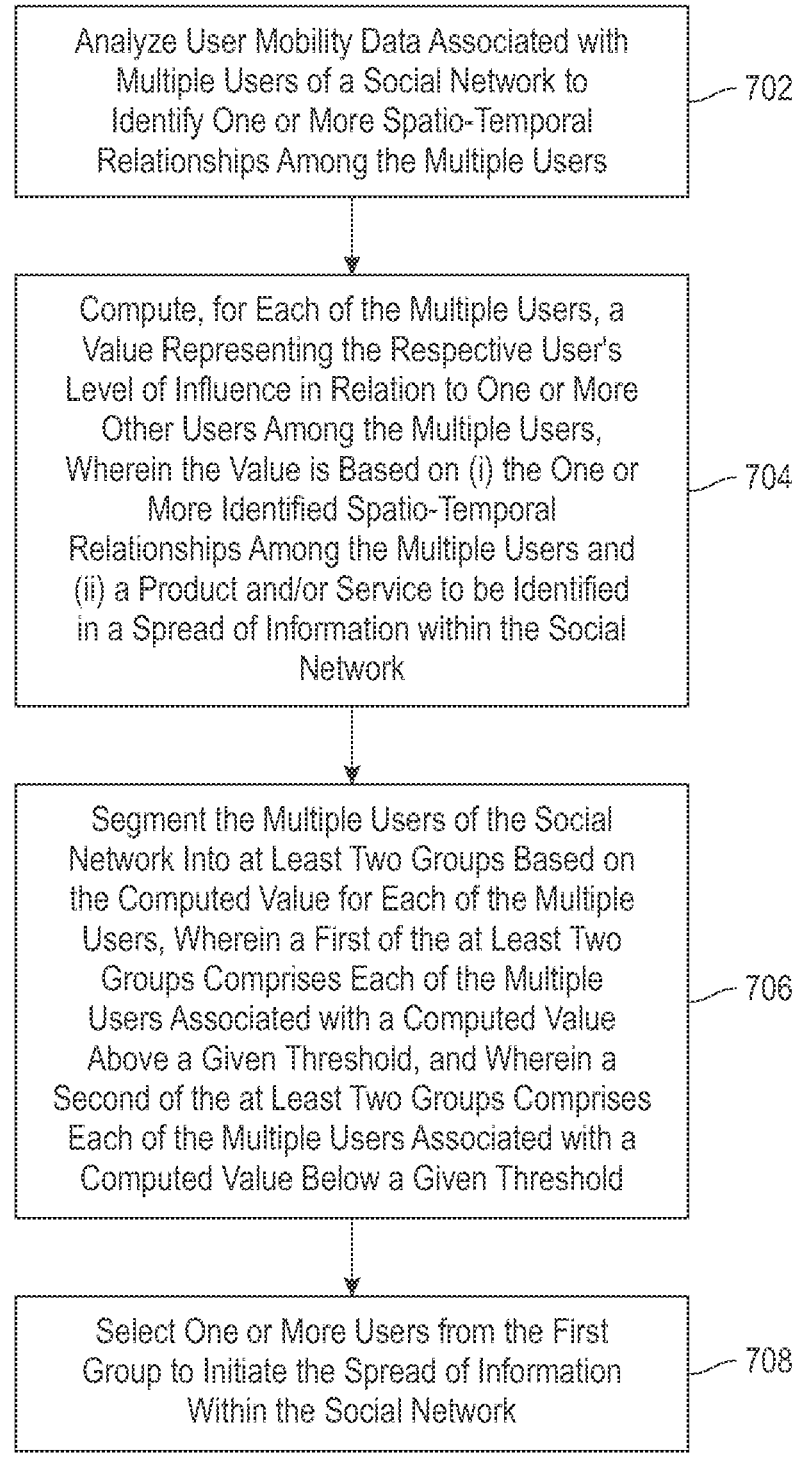
FIG. 7 is a flow diagram illustrating techniques according to an embodiment of the invention.

FIG. 7 is a flow diagram illustrating techniques according to an embodiment of the present invention. Step 702 includes analyzing user mobility data associated with multiple users of a social network to identify one or more spatio-temporal relationships among the multiple users. Identifying the one or more spatio-temporal relationships can include determining one or more locations associated with each of the multiple users as well as determining a geographical distance between (i) each of the multiple users and (ii) one or more additional ones of the multiple users.

Analyzing user mobility data can include analyzing a user profile associated with each of the multiple users of the social network. Also, the user mobility data can include an identification, for each of the multiple users, of each of one or more locations visited by the respective user. The user mobility data can further include an identification of a purpose for visiting each of the one or more locations visited by the respective user, and a frequency with which the respective user visited each of the one or more locations. Additionally, the user mobility data can include an identification, for each of the multiple users, of one or more repeatedly traveled routes, as well as a mode of transportation utilized during an instance of user mobility. Further, the user mobility data can include trajectory data associated with each of the multiple users, and analyzing such user mobility data can include analyzing the trajectory data associated with each of the multiple users in conjunction with one or more maps.

Step 704 includes computing, for each of the multiple users, a value representing the respective user's level of influence in relation to one or more other users among the multiple users, wherein the value is based on (i) the one or more identified spatio-temporal relationships among the multiple users and (ii) a product and/or service to be identified in a spread of information within the social network.

Step 706 includes segmenting the multiple users of the social network into at least two groups based on the computed value for each of the multiple users, wherein a first of the at least two groups comprises each of the multiple users associated with a computed value above a given threshold, and wherein a second of the at least two groups comprises each of the multiple users associated with a computed value below the given threshold.

Step 708 includes selecting one or more users from the first group to initiate the spread of information within the social network. As detailed herein, the spread of information within the social network can include a marketing effort associated with a product and/or service.

Selecting the one or more users from the first group can include implementing an objective function that comprises a difference between two sub-modular functions, as well as implementing a greedy algorithm based on one or more sub-modular function optimization techniques to determine the top-k users from the first group to maximize diffusion of information through the first group of the social network.

The techniques depicted in FIG. 7 can also include providing the information to the one or more selected users from the first group.

Also, an additional embodiment of the invention includes analyzing mobility data associated with multiple nodes of a graph to identify one or more spatio-temporal relationships among the multiple nodes, wherein the graph represents a social network and wherein each of the multiple nodes represents a user of the social network; computing, for each of the multiple nodes, a value representing the respective node's level of influence in relation to the multiple nodes of the graph, wherein the value is based on the one or more identified spatio-temporal relationships; segmenting the multiple nodes of the graph into at least two groups based on the computed value for each of the multiple nodes, wherein a first of the at least two groups comprises each of the multiple nodes associated with a computed value above a given threshold, and wherein a second of the at least two groups comprises each of the multiple nodes associated with a computed value below a given threshold; and selecting one or more seed nodes from the nodes in the first group to initiate a spread of information within the graph.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
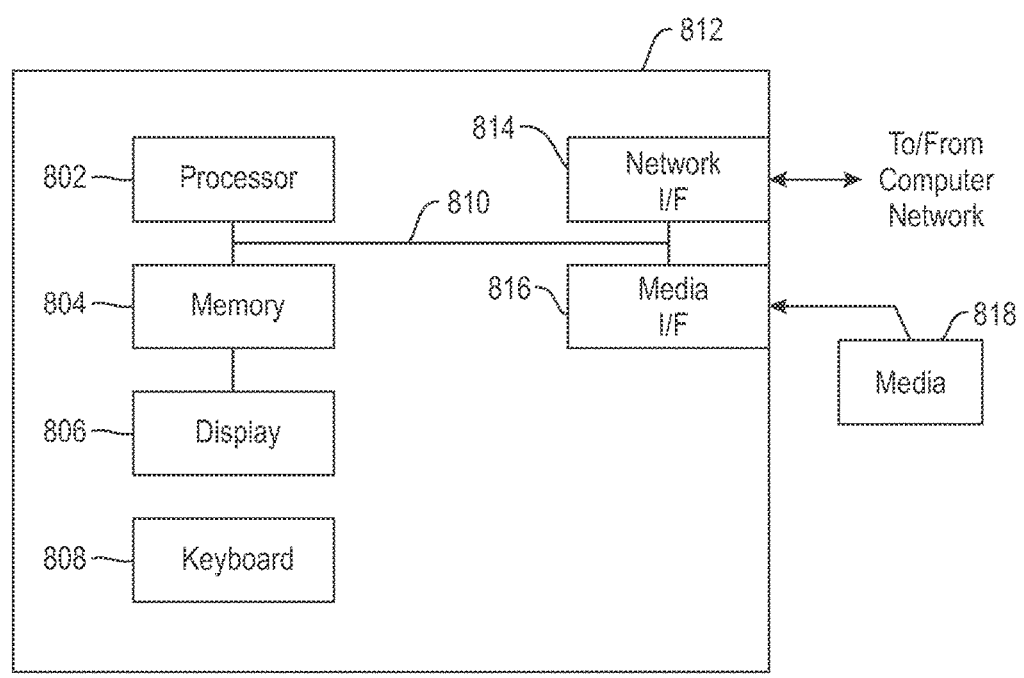
FIG. 8 is a system diagram of an exemplary computer system on which at least one embodiment of the invention can be implemented.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, deriving context-specific intrinsic value of users to segment social networks to focused and unfocused segments for focused marketing of one or more products and/or services, wherein the context-specific intrinsic value is derived based on social networks and user mobility data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
analyzing user mobility data associated with multiple users of a social network to identify one or more spatio-temporal relationships among the multiple users;
computing, for each of the multiple users, a value representing the respective user's level of influence in relation to one or more other users among the multiple users, wherein the value is based on (i) the one or more identified spatio-temporal relationships among the multiple users and (ii) a product and/or service to be identified in a spread of information within the social network;
segmenting the multiple users of the social network into at least two groups based on the computed value for each of the multiple users, wherein a first of the at least two groups comprises each of the multiple users associated with a computed value above a given threshold, and wherein a second of the at least two groups comprises each of the multiple users associated with a computed value below the given threshold;
selecting, based at least in part on execution of an algorithm, one or more users from the first group to spread the information within the social network, wherein the algorithm maximizes the spread of the information through the first group and minimizes the spread of the information through the second group, wherein the algorithm comprises $$\arg\max_{S:|S|\leq k} \sigma_A(S, T) - \sigma_{V\setminus A}(S, T),$$

wherein S represents the one or more selected users, T represents a time frame in question, V represents a set of nodes in the social network that represents the multiple users, k represents a number of users to be selected from the first group to initiate the spread of the information, $(\sigma_A(S,T))$ represents an expected utility associated with the first group, and $(\sigma_{V\setminus A}(S,T))$ represents an expected utility loss associated with the second group; and
spreading the information through one or more portions of the social network via providing the information to the one or more selected users from the first group;
wherein the steps are carried out by at least one computing device.

2. The computer-implemented method of claim 1, wherein identifying the one or more spatio-temporal relationships comprises determining one or more locations associated with each of the multiple users.

3. The computer-implemented method of claim 1, wherein identifying the one or more spatio-temporal relationships comprises determining a geographical distance between (i) each of the multiple users and (ii) one or more additional ones of the multiple users.

4. The computer-implemented method of claim 1, wherein said selecting the one or more users from the first group comprises implementing an objective function that comprises a difference between two sub-modular functions.

5. The computer-implemented method of claim 1, wherein said selecting the one or more users from the first group comprises implementing a greedy algorithm based on one or more sub-modular function optimization techniques to determine the top-k users from the first group to maximize diffusion of information through the first group of the social network.

6. The computer-implemented method of claim 1, wherein said analyzing user mobility data comprises analyzing a user profile associated with each of the multiple users of the social network.

7. The computer-implemented method of claim 1, wherein the user mobility data comprise an identification, for each of the multiple users, of each of one or more locations visited by the respective user.

8. The computer-implemented method of claim 7, wherein the user mobility data further comprise an identification of a purpose for visiting each of the one or more locations visited by the respective user.

9. The computer-implemented method of claim 7, wherein the user mobility data comprise a frequency with which the respective user visited each of the one or more locations.

10. The computer-implemented method of claim 1, wherein the user mobility data comprise an identification, for each of the multiple users, of one or more repeatedly traveled routes.

11. The computer-implemented method of claim 1, wherein the user mobility data comprise an identification, for each of the multiple users, of a mode of transportation utilized during an instance of user mobility.

12. The computer-implemented method of claim 1, wherein the user mobility data comprise trajectory data associated with each of the multiple users.

13. The computer-implemented method of claim 12, wherein said analyzing user mobility data comprises analyzing the trajectory data associated with each of the multiple users in conjunction with one or more maps.

14. The computer-implemented method of claim 1, wherein the spread of information within the social network comprises a marketing effort associated with a product and/or service.

15. A computer program product, the computer program product comprising a computer readable storage medium having program instructions embodied therewith, the program instructions executable by a device to cause the device to:
analyze user mobility data associated with multiple users of a social network to identify one or more spatio-temporal relationships among the multiple users;
compute, for each of the multiple users, a value representing the respective user's level of influence in relation to one or more other users among the multiple users, wherein the value is based on (i) the one or more identified spatio-temporal relationships among the multiple users and (ii) a product and/or service to be identified in a spread of information within the social network;
segment the multiple users of the social network into at least two groups based on the computed value for each of the multiple users, wherein a first of the at least two groups comprises each of the multiple users associated with a computed value above a given threshold, and wherein a second of the at least two groups comprises each of the multiple users associated with a computed value below the given threshold;
select, based at least in part on execution of an algorithm, one or more users from the first group to spread the information within the social network, wherein the algorithm maximizes the spread of the information through the first group and minimizes the spread of the information through the second group, wherein the algorithm comprises $$\arg\max_{S:|S|\leq k} \sigma_A(S, T) - \sigma_{V\setminus A}(S, T),$$

wherein S represents the one or more selected users, T represents a time frame in question, V represents a set of nodes in the social network that represents the multiple users, k represents a number of users to be selected from the first group to initiate the spread of the information, $(\sigma_A(S,T))$ represents an expected utility associated with the first group, and $(\sigma_{V\setminus A}(S,T))$ represents an expected utility loss associated with the second group; and
spread the information through one or more portions of the social network via providing the information to the one or more selected users from the first group.

16. A system comprising:
a memory; and
at least one processor coupled to the memory and configured for:
analyzing user mobility data associated with multiple users of a social network to identify one or more spatio-temporal relationships among the multiple users;
computing, for each of the multiple users, a value representing the respective user's level of influence in relation to one or more other users among the multiple users, wherein the value is based on (i) the one or more identified spatio-temporal relationships among the multiple users and (ii) a product and/or service to be identified in a spread of information within the social network;
segmenting the multiple users of the social network into at least two groups based on the computed value for each of the multiple users, wherein a first of the at least two groups comprises each of the multiple users associated with a computed value above a given threshold, and wherein a second of the at least two groups comprises each of the multiple users associated with a computed value below the given threshold;
selecting, based at least in part on execution of an algorithm, one or more users from the first group to spread the information within the social network, wherein the algorithm maximizes the spread of the information through the first group and minimizes the spread of the information through the second group, wherein the algorithm comprises $$\arg\max_{S:|S|\leq k} \sigma_A(S, T) - \sigma_{V\setminus A}(S, T),$$

wherein S represents the one or more selected users, T represents a time frame in question, V represents a set of nodes in the social network that represents the multiple users, k represents a number of users to be selected from the first group to initiate the spread of the information, $(\sigma_A(S,T))$ represents an expected utility associated with the first group, and $(\sigma_{V\setminus A}(S,T))$ represents an expected utility loss associated with the second group; and spreading the information through one or more portions of the social network via providing the information to the one or more selected users from the first group.

17. A computer-implemented method, comprising:
analyzing mobility data associated with multiple nodes of a graph to identify one or more spatio-temporal relationships among the multiple nodes, wherein the graph represents a social network and wherein each of the multiple nodes represents a user of the social network;
computing, for each of the multiple nodes, a value representing the respective node's level of influence in relation to the multiple nodes of the graph, wherein the value is based on the one or more identified spatio-temporal relationships;
segmenting the multiple nodes of the graph into at least two groups based on the computed value for each of the multiple nodes, wherein a first of the at least two groups comprises each of the multiple nodes associated with a computed value above a given threshold, and wherein a second of the at least two groups comprises each of the multiple nodes associated with a computed value below the given threshold;
selecting, based at least in part on execution of an algorithm, one or more seed nodes from the nodes in the first group to spread the information within the graph, wherein the algorithm maximizes the spread of the information through the first group and minimizes the spread of the information through the second group, wherein the algorithm comprises $$\arg\max_{S:|S|\leq k} \sigma_A(S, T) - \sigma_{V\backslash A}(S, T),$$

wherein S represents the one or more selected seed nodes, T represents a time frame in question, V represents the multiple nodes in the social network that represents the multiple users, k represents a number of seed nodes to be selected from the first group to initiate the spread of the information, ($\sigma_A(S,T)$) represents an expected utility associated with the first group, and ($\sigma_{V\backslash A}(S,T)$) represents an expected utility loss associated with the second group; and
spreading the information through one or more portions of the graph via providing the information to the one or more selected seed nodes;
wherein the steps are carried out by at least one computing device.

* * * * *